United States Patent [19]
Kozlowsky et al.

[11] Patent Number: 5,511,743
[45] Date of Patent: Apr. 30, 1996

[54] MEDIA INPUT SELECTOR AND METHOD

[75] Inventors: Edward P. Kozlowsky, Sanford, Me.; Joseph R. Lyons, Jr., Wilmington, Mass.

[73] Assignee: Miles, Inc., Wilmington, Mass.

[21] Appl. No.: 156,459

[22] Filed: Nov. 23, 1993

[51] Int. Cl.⁶ .......................... B65H 19/10; B65H 20/02
[52] U.S. Cl. ............... 242/526; 242/560; 242/564.4; 226/110; 226/180
[58] Field of Search ................... 242/560, 564.4, 242/526, 527; 226/110, 177, 180, 187; 355/309, 310, 311

[56] References Cited

U.S. PATENT DOCUMENTS

| | | | |
|---|---|---|---|
| 1,115,586 | 11/1914 | Schwas | 242/564.4 X |
| 2,246,456 | 6/1941 | Quigley | 226/110 |
| 3,850,356 | 11/1974 | Abe et al. | 226/110 |
| 4,085,879 | 4/1978 | Nobuhiro | 242/564.4 X |
| 4,094,474 | 6/1978 | Stollenwerk et al. | |
| 4,159,807 | 7/1979 | Honsel et al. | 226/110 |
| 4,813,321 | 3/1989 | Landsman | 226/110 X |
| 4,868,674 | 9/1989 | Nakamura et al. | 358/296 |
| 4,980,717 | 12/1990 | Kiguchi | 355/50 |
| 5,037,016 | 8/1991 | Wingerter | 226/110 |
| 5,197,687 | 3/1993 | Yamada et al. | |

FOREIGN PATENT DOCUMENTS

4022883A1  2/1991  Germany.

*Primary Examiner*—John M. Jillions
*Attorney, Agent, or Firm*—Julie A. Krolikowski

[57] ABSTRACT

A method and apparatus automatically switches from one web media type to another, using a single drive roller to access and drive one of two web media supply cassettes mounted within an imaging system. A gear motor and eccentric shaft position and load the drive roller against either of two driven rollers. The media is nipped between the drive roller and one of the driven rollers and is advanced by the drive roller into the imaging system as needed. To switch media supply cassettes, the media is cut beyond the drive roller. The media is then drawn back into the supply cassette to free the media path for the alternate media to advance from the other of the two media supply cassettes.

11 Claims, 3 Drawing Sheets

MEDIA INPUT SELECTOR AND METHOD

BACKGROUND OF THE INVENTION

The invention is intended to answer a long-felt need in the field of image recording. More specifically, the invention allows for selection of a media type, whether it be paper, film, or plate, or a different size media of the same type. Two media supply cassettes are mounted within an internal drum recorder, or the like. Selection of the media can be programmed to be automatic, or can be input by a user's command.

A general object of the invention is to select media from one of two supply cassettes that are mounted within an imaging system.

It is a general object of the invention to prevent waste of unexposed media.

A feature of the invention is a rewinding mechanism provided on the media supply cassettes.

SUMMARY OF THE INVENTION

An apparatus for selecting one of two media supply cassettes to feed media into a media path comprises input means for inputting a command designating a selected supply cassette and positioning means for automatically positioning a drive roller into a position corresponding to the command. The drive roller contacts a driven roller adjacent to the selected supply cassette and pinches a leading edge of media therebetween that extends out from the selected supply cassette into a feed path of the selected supply cassette. The apparatus also includes driving means for driving the drive roller to feed the media out from the selected supply cassette through the feed path and into the media path.

A method for selecting media from one of two media supply cassettes to feed the media into a media path comprises inputting a command to designate a selected supply cassette and automatically positioning a drive roller into a position corresponding to the command. The drive roller contacts a driven roller adjacent to the selected supply cassette, and pinches a leading edge of media therebetween that extends out from the selected supply cassette into a feed path of the selected supply cassette. The next step is driving the drive roller to feed the media out from the selected supply cassette through the feed path and into the media path.

BRIEF DESCRIPTION OF THE DRAWINGS

The features and objects of the invention will become apparent in the following description when taken with the accompanying drawings, in which.

DETAILED DESCRIPTION OF THE INVENTION

Figure 1:
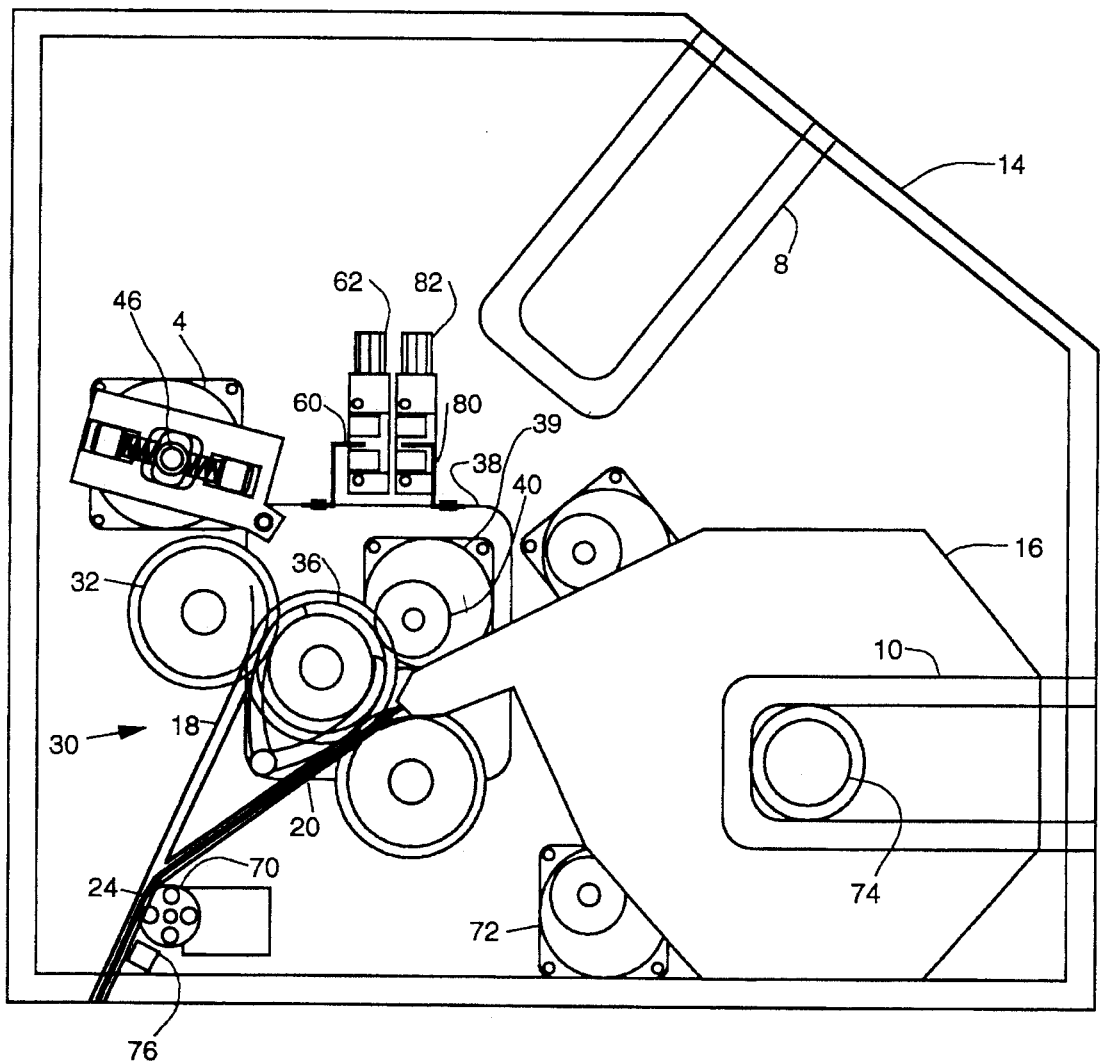
FIG. 1 is a side view of an input media selector.

Referring to FIG. 1, two mounting brackets 8, 10 are provided in a housing 14 of an imaging system for supporting two media supply cassettes 16 (one shown). There are two media feed paths 18, 20 that begin at each supply cassette 16 and join to form a main media path 24 downstream of a roller drive assembly, generally referred to by reference numeral 30.

The drive roller assembly 30, has two driven rollers 32, 34 that are located in fixed positions adjacent to the media feed paths 18, 20, respectively. A drive roller 36 is positioned between the two driven rollers 32, 34 and is movable to be in rolling contact with either of the driven rollers 32, 34. The drive roller 36 is rotatably mounted on a movable bracket 38.

Figure 2:
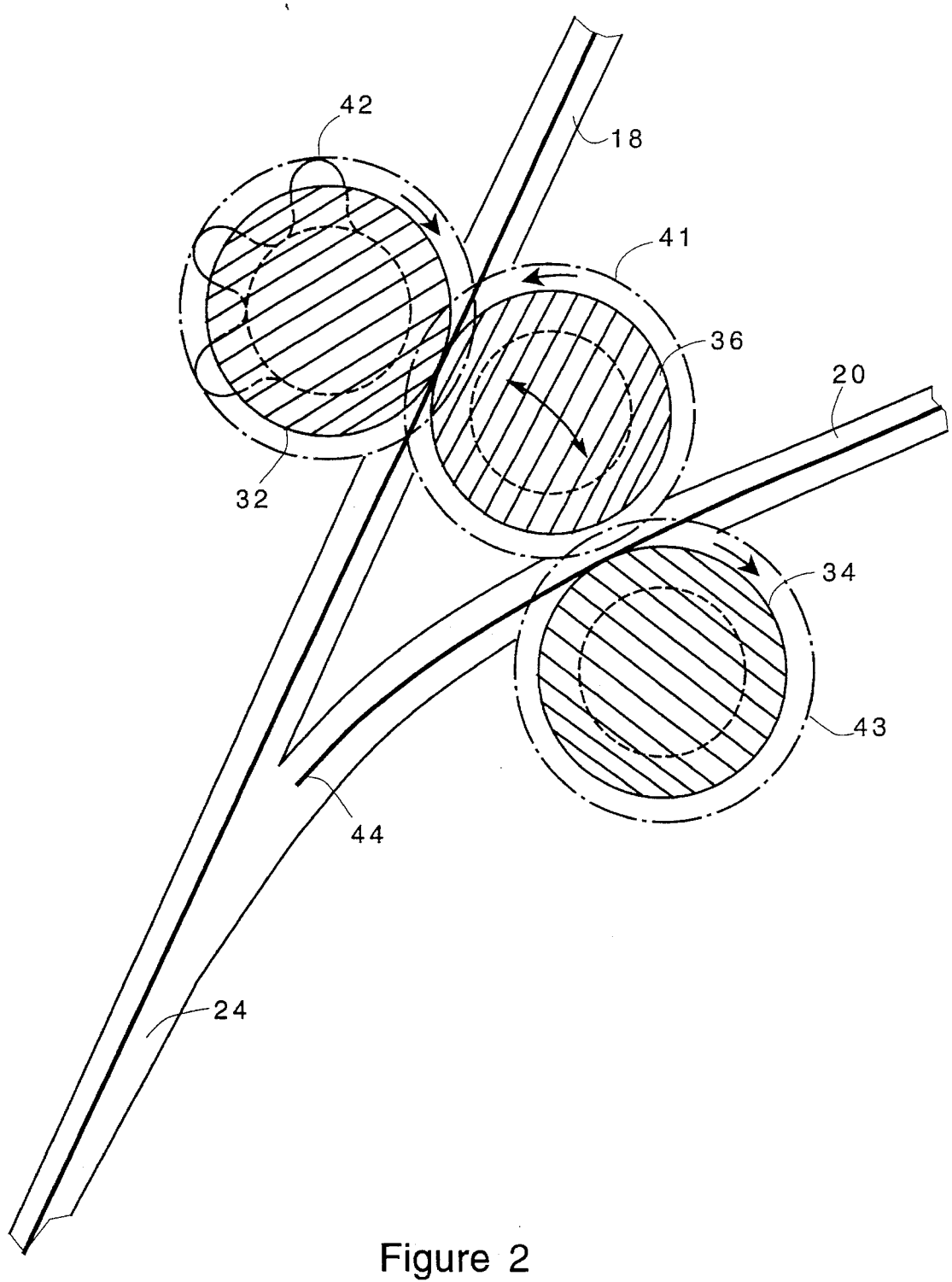
FIG. 2 is sectional view of a roller drive assembly used in the input media selector; and, FIG. 3 is a view similar to FIG. 2 including more details of the roller drive assembly.

Referring now to FIGS. 1 and 2, the movable bracket 38 carries a drive motor 39 that has a motor gear 40 engaged with a drive roller gear 41 nonrotatably mounted to the end of the drive roller 36. Upon rotation of the drive motor 39, the motor gear 40 rotates drive roller gear 41, which in turn rotates the drive roller 36. The driven rollers 32, 34 each have a gear 42 (tooth profile partially shown), 43, mounted nonrotatably to an end respectively, that is either partially or fully engaged with drive roller gear 41. In FIG. 2 it can be seen that gears 41 and 42 are fully engaged and gears 41 and 43 are partially engaged.

The drive roller gear 41 drives both of the driven roller gears 42, 43 when rotated to avoid misalignment problems that might occur if the gears were to completely disengage. However, the drive roller 36 contacts only one of the driven rollers 32, 34 at a time due to a clearance provided between the drive roller 36 and the driven rollers 32, 34. In FIG. 2, drive roller 36 and driven roller 32 advance the media from media feed path 18 while the clearance allows the leading edge 44 of the non-selected media supply cassette to extend between and beyond the drive roller 36 and the driven roller 34 without advancing, despite rotation of the drive roller 36 and the driven roller 34.

Figure 3:
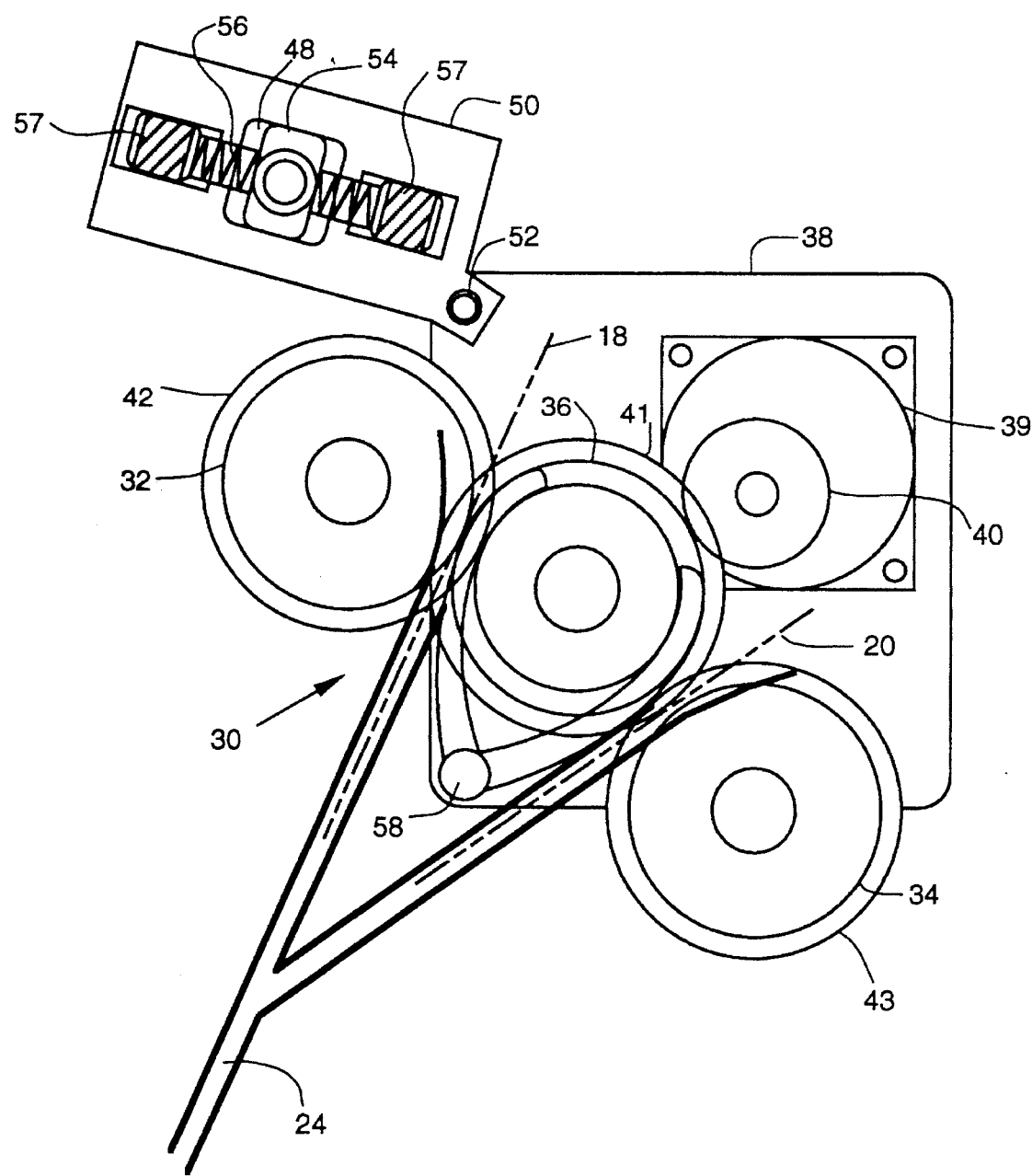

A gear motor 45 (FIG. 1) has an eccentric shaft 46 and is rigidly mounted to the housing 14. Referring now to FIGS. 1 and 3, the eccentric shaft 46 passes through an aperture 48 in a bracket 50 that is attached to the movable bracket 38 by a pivotable fastener 52. A rectangular bronze bushing 54 is located between the bracket 50 and the eccentric shaft 46. Two compression springs 56 apply a predetermined load to the bronze bushing 54 by means of set screws 57. When driven by the eccentric shaft 46, the bracket 50 moves linearly toward the bracket 38 causing the bracket 38 to pivot at pivot points 52 and 58. Since the drive roller is mounted to bracket 38, it pivots back and forth between the two driven rollers 32 and 34.

To select media from one of the two supply cassettes, the user of the imaging system inputs a command indicating the desired supply cassette. Through control software and hardware (not shown) the gear motor 45 is activated to drive the eccentric shaft 46. The rotary motion of the eccentric shaft 46 is translated through the aperture 48 into pivotal motion of the bracket 38 about pivot point 58.

If the lower supply cassette 16 is selected, the eccentric shaft 46 drives the bracket 50 to the right, causing bracket 38 and drive roller 36 to pivot with respect to pivot point 58 (FIG. 3) in a clockwise direction toward the driven roller 34. A leading edge of media extending out of supply cassette 16 into the feed path 20 is nipped between the rollers 34, 36 as the drive roller is pressed against the driven roller 34. Then, the eccentric shaft 46 is overdriven, causing the bushing 54 to compress the spring 56 to the right of the aperture 48 and thus move the brackets 50, 38 to provide a firm force between the drive roller 36 and the driven roller 34.

A flag 60 (FIG. 1) mounted on the bracket 38 breaks a beam of light within a photo interrupter 62 which is mounted to the housing 14. The flag 60 breaks the beam of light when the drive roller 36 has reached the proper position against driven roller 34, and the gear motor 45 is switched off. Next, the drive roller motor 39 is switched on thereby driving drive roller 36 in a clockwise direction. The media that has been nipped between the drive roller 36 and the driven roller 34 is advanced through the feed path 20 and into the main media path 24 as needed.

A jam sensor 70 is shown in FIG. 1 at the entrance to the media path 24. The jam sensor 70 senses the motion of the media as it advances through the media path. If the motion of the media is not sensed by the jam sensor 70, then a signal is displayed to the operator indicating a jam in the media path 24.

When the user is finished using the selected media supply cassette 16, and wishes to use the media supply cassette normally mounted in bracket 8, the media in the path is cut on an output side beyond the drive roller assembly 30. The drive roller motor 39 is operated in reverse and simultaneously a supply cassette rewind motor 72 is turned on. The media is extracted from the media path 24 back up feed path 20, and rewound onto the supply core 74 of the supply cassette 16. The rewind motor 72 is attached to the supply core 74 by conventional gearing (not shown). A leading edge of the media is left extending out from the supply cassette 16 past driven roller 34. This rewind procedure allows the media previously in the media path 24 to be used at a later time. Then the media path 24 is clear for media from the supply cassette normally mounted in bracket 8, to enter through the feed path 18. A media sensor 76 (FIG. 1) senses the presence or lack of presence of media in the media path 24, and following the rewind procedure, displays a signal to the operator indicating that a new media selection or input command may be made. The process is then repeated.

Selection of the supply cassette normally mounted in bracket 8, moves the drive roller 36 into driving contact with driven roller 32. This occurs by the action of the eccentric shaft 46 urging the bracket 50 to the left as viewed in FIG. 1 and pivoting the drive roller 36 in a counterclockwise direction around the pivot point 58. Overdrive of the eccentric shaft 46 causes compression of the spring 56 on the left side of aperture 48. A flag 80 mounted on bracket 38 breaks a beam of light within a photo interrupter 82 when the drive roller has reached the proper position against driven roller 32 and the gear motor 45 is switched off.

While this invention has been described in terms of a preferred embodiment, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by Letters of Patent of the United States are the following:

1. A method for selecting media from one of two media supply cassettes to feed the media into a media path, comprising the steps of:

a. inputting a command designating a selected supply cassette;

b. automatically positioning a moveable drive roller to be in driving contact with one of two driven rollers respectively mounted adjacent the two media supply cassettes, said positioning of the drive roller in response to said inputting of the command, to pitch between the drive roller and the one of two driven rollers adjacent to the selected supply cassette a leading edge of media extending out from the selected supply cassette into a feed path of the selected supply cassette; and, c. driving the drive roller thereby rotating said one of two driven rollers and feeding the media out from the selected supply cassette through the feed path and into the media path.

2. The method according to claim 1 further comprising the steps of:

a. cutting the media such that a length of media extends out from the selected supply cassette through the feed path and into said media path; and, b. driving the drive roller in reverse and simultaneously rewinding the supply cassette, thereby returning the length of media in the media path to the selected supply cassette such that the leading edge of the media extends only into the feed path.

3. The method according to claim 1 wherein automatically positioning the drive roller includes the steps of:

a. rotating an eccentric shaft;

b. translating rotational movement of the eccentric shaft into pivotal motion of the drive roller; and, c. overdriving the eccentric shaft thereby providing firm contact between the drive roller and the driven roller to effectively pinch the leading edge of media.

4. An apparatus for selecting one of two media supply cassettes to feed media into a media path, comprising:

a. input means for inputting a command designating a selected supply cassette;

b. positioning means for automatically positioning a moveable drive roller to be in driving contact with one of two driven rollers respectively mounted adjacent the two media supply cassettes, said positioning of the drive roller in response to said inputting of the command to pinch between the drive roller and the one of two driven rollers adjacent to the selected supply cassette a leading edge of media extending out from the selected supply cassette into a feed path of the selected supply cassette; and, c. driving means for driving the drive roller thereby rotating said one of two driven rollers an feeding the media out from the selected supply cassette through the feed path and into the media path.

5. The apparatus according to claim 4 further comprising:

a. cutting means for cutting the media such that a length of media extends from the selected supply cassette into the media path;

b. rewind means for rewinding the selected supply cassette thereby returning the length of media in the media path to the selected supply cassette such that the media only extends out from the selected supply cassette into the feed path.

6. The apparatus according to claim 5 wherein said rewind means includes a rewind gear mounted on the selected supply cassette and a rewind motor in driving contact with said rewind gear.

7. The apparatus according to any of claims 4, 5 or 6 wherein said positioning means includes:

a. rotating means for rotating an eccentric shaft;

b. translating means for translating rotational movement of the eccentric shaft into pivotal motion of the drive roller; and, c. overdrive means for overdriving the eccentric shaft thereby providing firm contact between the drive roller and the driven roller to effectively pinch the leading edge of media.

8. An apparatus for selecting one of two media supply cassettes to feed media into a media path, comprising:
- a. a housing;
- b. a first media path and a second media path;
- c. a first driven roller and a second driven roller mounted for rotation within said housing, adjacent to said first media path and said second media path, respectively;
- d. a drive roller movably mounted to said housing between said first driven roller and said second driven roller, such that said first media path is between said first driven roller and said drive roller, and said second media path is between said second driven roller and said drive roller, said drive roller movable between two positions such that in a first position said drive roller is in rolling contact only with said first driven roller and in a second position said drive roller is in rolling contact only with said second driven roller; and,
- e. positioning means for positioning said drive roller between said first position and said second position.

9. The apparatus according to claim 8, further comprising:
- a. a drive gear fixed to said drive roller so as to be movable therewith and so as to rotationally drive said drive roller;
- b. a first driven gear fixed to said first driven roller, said first driven gear being fully engaged with said drive gear when said drive roller is in said first position and at least partially engaged with said drive gear when said drive roller is in said second position; and,
- c. a second driven gear fixed to said second driven roller, said second driven gear being fully engaged with said drive gear when said drive roller is in said second position and at least partially engaged with said drive gear when said drive roller is in said first position.

10. The apparatus according to claim 8, further comprising rotating means for rotating said drive roller forward and reverse when in contact with either of said first driven roller and said second driven roller, said drive means rotating said drive roller forward to feed media and rotating said drive roller in reverse to rewind media.

11. In an image recording device for outputting images onto image recording media, a media selector comprising:
- a. a first media supply cassette containing a first supply rolls of an image recording media and a second media supply cassette containing a second supply roll of an image recording media, said first and second supply cassettes mounted within a housing of the image recording device;
- b. a first driven roller and a second driven roller mounted for rotation in the housing adjacent to the first and the second supply cassettes, respectively;
- c. a drive roller movably mounted to said housing between said first driven roller and said second driven roller, said drive roller movable between two positions in which a first position said drive roller is in rolling contact with said first driven roller and in a second position said drive roller is in rolling contact with said second driven roller;
- d. rotating means for rotating said drive roller in forward and in reverse to feed and rewind media from the first and second supply cassettes, said rotating means directly coupled to said drive roller to impart rotation directly to said drive roller and to transfer rotation to said first and second driven rollers through said rolling contact with said driven roller; and
- e. positioning means for positioning said drive roller between said first and second position.

* * * * *